United States Patent [19]

Umio et al.

[11] 3,928,356
[45] Dec. 23, 1975

[54] 10-[4-(ω-HYDROXY ALKYL)-1-PIPERAZIMYL]-DIBENZO (H,F) OXOFINS AND THIEPINS AND ACETYL ESTERS THEREOF

[75] Inventors: Suminori Umio, Kawanishi; Ikuo Ueda, Yao; Yoshinari Sato, Ikeda; Shizuo Maeno, Osaka, all of Japan

[73] Assignee: Fujisawa Pharmaceutical Co., Ltd., Japan

[22] Filed: Nov. 14, 1972

[21] Appl. No.: 306,394

Related U.S. Application Data

[63] Continuation of Ser. No. 874,710, Nov. 6, 1969, abandoned, which is a continuation-in-part of Ser. No. 762,998, Sept. 26, 1968, abandoned.

[30] Foreign Application Priority Data

| | | |
|---|---|---|
| Oct. 6, 1967 | Japan | 42-64540 |
| Dec. 20, 1967 | Japan | 42-81731 |
| Jan. 29, 1968 | Japan | 43-5280 |
| Feb. 28, 1968 | Japan | 43-12773 |
| Mar. 4, 1968 | Japan | 43-13966 |
| Mar. 19, 1968 | Japan | 43-18122 |
| Apr. 10, 1968 | Japan | 43-23917 |
| June 24, 1968 | Japan | 43-44033 |

[52] U.S. Cl.  260/268 TR; 260/239 BC; 260/247.1 R; 260/247.5 R; 260/247.7 G; 260/293.67; 260/293.68; 260/326.81; 260/327 B; 260/333; 260/570.8 TC; 424/244; 424/248; 424/250; 424/267
[51] Int. Cl.$^2$  C07D 295/04
[58] Field of Search  260/268 TR

[56] References Cited
UNITED STATES PATENTS

| | | | |
|---|---|---|---|
| 3,337,554 | 8/1967 | Jilek | 260/268 TR |
| 3,370,061 | 2/1968 | Corts | 260/268 TR |
| 3,457,264 | 7/1969 | Viterbo | 260/268 TR |
| 3,520,890 | 7/1970 | Fouche | 260/268 TR |
| 3,575,980 | 4/1971 | Mastursi et al. | 260/268 TR |
| 3,600,391 | 8/1971 | Mastursi et al. | 260/268 TR |
| 3,681,354 | 8/1972 | Mastursi et al. | 260/268 TR |

OTHER PUBLICATIONS

Umio et al., I, Chem. Abstr. Vol. 74 (1971) abstracting Japan 70 29,830. Col. 22880s
Umio et al. II, Chem. Abstr. Vol. 75, Col. 76847a and 76849c abstracting Japan 71 21,391, Japan 71 21,392.
Umio et al. Chem. Abstr. Vol. 71, Col. 112976v abstracting German 1,801,523 (June 69).

*Primary Examiner*—Paul M. Coughlan, Jr.
*Attorney, Agent, or Firm*—Jordan B. Bierman; Linda G. Bierman; Kenneth J. Stempler

[57] ABSTRACT

Tricyclic enamine compounds of the formula:

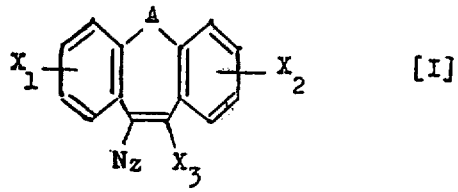

wherein A is oxy, thio, lower alkylimino, or ethylidene; one of $X_1$ and $X_2$ is hydrogen and the other is hydrogen, halogen, lower alkyl, lower alkoxy, lower alkylthio, lower alkanesulfonyl, lower alkylsulfamoyl, di(lower)alkylsulfamoyl, lower alkanoylamino, trifluoromethyl, nitro or amino; $X_3$ is hydrogen, lower alkyl or phenyl(lower)alkyl and $N_z$ is a 5 to 7-membered cyclic amino group. These compounds are useful as psychotropic agents, particularly as tranquilizers.

11 Claims, No Drawings

10-[4-(ω-HYDROXY ALKYL)-1-PIPERAZIMYL]-DIBENZO (H,F) OXOFINS AND THIEPINS AND ACETYL ESTERS THEREOF

This is a Rule 60 continuation of co-pending application Ser. No. 874,710, filed Nov. 6, 1969, now abandoned, which is a continuation-in-part application of Ser. No. 762,998, filed Sept. 26, 1968, now abandoned.

The present invention relates to new tricyclic enamine compounds having psychotropic activity and their production.

In this specification, the term "lower" used in connection with the straight or branched alkane, alkene or alkyne moiety is intended to mean the one having 1 to 6 carbon atoms.

The tricyclic enamine compounds are representable by the formula:

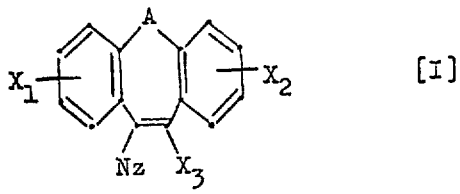

wherein A is oxy, thio, lower alkylimino (e.g. methylimino, ethylimino) or ethylidene; one of $X_1$ and $X_2$ is hydrogen and the other is hydrogen, halogen (e.g. fluorine, chlorine, bromine), lower alkyl (e.g. methyl, ethyl, propyl), lower alkoxy (e.g. methoxy, ethoxy, propoxy), lower alkylthio (e.g. methylthio, ethylthio, propylthio), lower alkanesulfonyl (e.g. methanesulfonyl, ethanesulfonyl), lower alkylsulfamoyl (e.g. methylsulfamoyl, ethylsulfamoyl), di(lower)-alkylsulfamoyl (e.g. dimethylsulfamoyl, diethylsulfamoyl), lower alkanoylamino (e.g. acetamido, propionamido), trifluoromethyl, nitro or amino; $X_3$ is hydrogen, lower alkyl (e.g. methyl, ethyl, propyl, isopropyl) or phenyl(-lower)-alkyl e.g. benzyl, phenethyl) and Nz is a 5 to 7-membered cyclic amino group such as pyrrolidinyl, piperidino, piperazinyl, N-R-piperazinyl, diazepinyl, N-R-diazepinyl or morpholino. The cyclic amino groups comprising $N_z$ may have one or two substituent methyl groups. The symbol R represents lower alkyl (e.g. methyl, ethyl, propyl, isopropyl), lower alkenyl (e.g. allyl, butenyl), lower alkynyl (e.g. propargyl), lower alkanoyl (e.g. acetyl, propionyl), lower alkoxycarbonyl (e.g. methoxycarbonyl, ethoxycarbonyl), hydroxy(lower)alkyl (e.g. hydroxyethyl, hydroxypropyl), lower alkoxy(lower)alkyl (e.g. methoxyethyl, ethoxyethyl, methoxypropyl), lower alkanoyl(lower)alkyl (e.g. acetylmethyl, acetylethyl, propionylethyl, propionylbutyl), lower alkanoyloxy(lower)alkyl (e.g. acetyloxymethyl, acetyloxyethyl), lower alkoxycarbonyl(lower)alkyl (e.g. methoxycarbonylmethyl, ethoxycarbonylethyl, methoxycarbonylpropyl), hydroxy(lower)alkoxy(lower)alkyl (e.g. hydroxymethoxymethyl, hydroxyethoxyethyl), carbamoyl(lower)alkyl (e.g. carbamoylmethyl, carbamoylethyl), phenyl(lower)alkyl (e.g. benzyl, phenethyl), phenoxy(lower)alkyl (e.g. phenoxymethyl, phenoxyethyl), phenyl(lower)alkoxy(lower)alkyl (e.g. benzyloxymethyl, benzyloxyethyl), benzoyloxy(lower)alkyl (e.g. benzoyloxymethyl, benzoyloxyethyl), phenyl(lower)alkanoyloxy(lower)alkyl (e.g. phenacetyloxyethyl, phenacetyloxypropyl) or phenyl, in which the phenyl group may not have more than three halogen atoms (e.g. fluorine, chlorine, bromine), lower alkyl groups (e.g. methyl, ethyl, propyl) and/or lower alkoxy groups (e.g. methoxy, ethoxy, propoxy).

Specific examples of the compound [I] include 10-(1-pyrrolidinyl)dibenz[b,f]oxepin, 10-(1-pyrrolodinyl)-11-lower alkyl or phenyl(lower)alkyldibenz[b,f]oxepin, 10-piperidinodibenz[b,f]oxepin, 10-piperidino-11-lower alkyl or phenyl(lower)alkyldibenz[b,f]oxepin, 10-(1-piperazinyl)dibenz[b,f]oxepin, 10-(1-piperazinyl)-11-lower alkyl or phenyl(lower)alkyldibenz[b,f]oxepin, 10-(4-lower alkyl-1-piperazinyl)dibenz[b,f]oxepin, 10-(4-lower alkyl-1-piperazinyl)-11-lower alkyl or phenyl(lower)alkyldibenz[b,f]oxepin, 10-(4-lower alkenyl-1-piperazinyl)dibenz[b,f]oxepin, 10-(4-lower alkenyl-1-piperazinyl)-11-lower alkyl or phenyl(lower)alkyldibenz[b,f]oxepin, 10-(4-lower alkynyl-1-piperazinyl)dibenz[b,f]oxepin, 10-(4-lower alkynyl-1-piperazinyl)-11-lower alkyl or phenyl(lower)alkyldibenz[b,f]oxepin, 10-(4-phenyl-1-piperazinyl)dibenz[b,f]oxepin, 10-(4-phenyl-1-piperazinyl)-11-lower alkyl or phenyl(lower)alkyldibenz[b,f]-oxepin, 10-(4-lower alkanoyl-1-piperazinyl)dibenz[b,f]oxepin, 10-(4-lower alkanoyl-1-piperazinyl)-11-lower alkyl or phenyl(lower)alkyldibenzo[b,f]oxepin, 10-(4-lower alkoxycarbonyl-1-piperazinyl)dibenz[b,f]oxepin, 10-(4-lower alkoxycarbonyl-1-piperazinyl)-11-lower alkyl or phenyl(lower)alkyldibenz[b,f]oxepin, 10-[4-hydroxy(lower)alkyl-1-piperazinyl]dibenz[b,f]oxepin, 10-[4-hydroxy(lower)alkyl-1-piperazinyl]-11-lower alkyl or phenyl(lower)alkyldibenz[b,f]oxepin, 10-[4-lower alkoxy(lower)alkyl-1-piperazinyl]dibenz[b,f]oxepin, 10-[4-lower alkoxy(lower)alkyl-1-piperazinyl]-11-lower alkyl or phenyl(lower)alkyldibenz[b,f]oxepin, 10-[4-lower alkanoyl(lower)alkyl-1-piperazinyl]dibenz[b,f]oxepin, 10-[4-lower alkanoyl(lower)alkyl-1-piperazinyl]-11-lower alkyl or phenyl(lower)alkyldibenz[b,f]oxepin, 10-[4-lower alkanoyloxy(lower)alkyl-1-piperazinyl]dibenz[b,f]oxepin, 10-[4-lower alkanoyloxy(lower)alkyl-1-piperazinyl]-11-lower alkyl or phenyl(lower)alkyldibenz[b,f]oxepin, 10-[4-lower alkoxycarbonyl(lower)alkyl-1-piperazinyl]dibenz[b,f]oxepin, 10-[4-lower alkoxycarbonyl(lower)alkyl-1-piperazinyl]-11-lower alkyl or phenyl(lower)alkyldibenz[b,f]oxepin, 10-[4-hydroxy(lower)alkoxy(lower)alkyl-1-piperazinyl]dibenz[b,f]oxepin, 10-[4-hydroxy(lower)alkoxy(lower)alkyl-1-piperazinyl]-11-lower alkyl or phenyl(lower)alkyldibenz[b,f]oxepin, 10-[4-carbamoyl(lower)alkyl-1-piperazinyl]dibenz[b,f]oxepin, 10-[4-carbamoyl(lower)alkyl-1-piperazinyl]-11-lower alkyl or phenyl(lower)alkyldibenz[b,f]oxepin, 10-[4-phenyl(lower)alkyl-1-piperazinyl]dibenz[b,f]oxepin, 10-[4-phenyl(lower)alkyl-1-piperazinyl]-11-lower alkyl or phenyl(lower)alkyldibenz[b,f]oxepin, 10-[4-phenoxy(lower)alkyl-1-piperazinyl]dibenz[b,f]oxepin, 10-[4-phenoxy(lower)alkyl-1-piperazinyl]-11-lower alkyl or phenyl(lower)alkyldibenz[b,f]oxepin, 10-[4-phenyl(lower)alkoxy(lower)alkyl-1-piperazinyl]-dibenz[b,f]oxepin, 10-[4-phenyl(lower)alkoxy(lower)alkyl-1-piperazinyl]-11-lower alkyl or phenyl(lower)alkyldibenz[b,f]oxepin, 10-[4-benzoyloxy(lower)alkyl-1-piperazinyl]dibenz[b,f]oxepin, 10-[4-benzoyloxy(lower)alkyl-1-piperazinyl]-11-lower alkyl or phenyl(lower)alkyldibenz[b,f]oxepin, 10-[4-phenyl(lower)alkanoyloxy(lower)alkyl-1-piperazinyl]-dibenz[b,f]oxepin, 10-[4-phenyl(lower)alkanoyloxy(- lower)alkyl-1-piperazinyl]-11-lower alkyl or phenyl(-lower)alkyldibenz[b,f]oxepin, 10-morpholinodibenz[b,f]oxepin, 10-morpholino-11-lower alkyl or phenyl(lower)alkyldibenz[b,f]oxepin, 10-(1-azepinyl)dibenz[b,f]oxepin, 10-(1-azepinyl)-11-lower alkyl or phenyl(lower)alkyldibenz[b,f]oxepin, 10-(1,4-diazepinyl)dibenz[b,f]oxepin, 10-(1,4-diazepinyl)-11-lower alkyl or phenyl(lower)alkyldibenz[b,f]oxepin.

In the above described compounds, the diazepinyl group may have, at the 4-position, a substituent such as lower alkyl, lower alkenyl, lower alkynyl, phenyl, lower alkanoyl, lower alkoxycarbonyl, hydroxy(lower)alkyl, lower alkoxy(lower)alkyl, lower alkanoyl(lower)alkyl, lower alkanoyloxy(lower)alkyl, hydroxycarbonyl(lower)alkyl, lower alkoxycarbonyl(lower)alkyl, hydroxy(-lower)alkoxy(lower)alkyl, carbamoyl(lower)alkyl, phenyl(lower)alkyl, phenoxy(lower)alkyl, phenyl(-lower)alkoxy(lower)alkyl or benzoyloxy(lower)alkyl. Further, the phenyl moiety in the substituent at the 4-position of the piperazinyl or diazepinyl group may not have more than three halogen, lower alkyl and/or lower alkoxy groups and each of the pyrrolidinyl, piperidino, piperazinyl, diazepinyl and morpholino groups may not be substituted with more than three methyl groups.

In addition, further examples may include the corresponding 2 or 8-halo, lower alkyl, lower alkoxy, lower alkylthio, lower alkanesulfonyl, lower alkylsulfamoyl, di-(lower)alkylsulfamoyl, lower alkanoylamino, trifluoromethyl, nitro or amino derivative. Further examples may include the corresponding dibenzo[b,f]thiepin, 5-lower alkyl-5H-dibenz[b,f]azepine or dibenzo[a,d]cycloheptene derivative.

It has been found that the compounds (I) and their salts (i.e. pharmaceutically acceptable acid addition salts and quaternary ammonium salts) show characteristic psychotropic and neurotropic activity such as central nervous system depressing activity, antihistaminic activity, analgesic activity, antiemetic activity and spasmolytic activity. Their tranquilizing action is particularly notable.

Accordingly, a basic object of the present invention is to embody the compounds (I) and their salts. Another object of this invention is to embody the compounds (I) and their salts having psychotropic activity. Another object of the invention is to embody the compounds (I) and their salts useful as tranquilizers. A further object of the invention is to embody a process for preparing the compounds (I) and their salts. These and other objects will be apparent from the subsequent descriptions to those conversant with the art to which the present invention pertains.

According to the present invention, the compounds [I] may be prepared by various procedures. The fundamental procedure is represented by the following formulae:

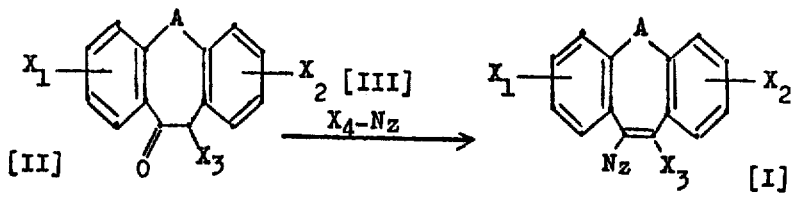

wherein A, $X_1$, $X_2$, $X_3$ and $N_z$ are each as defined above and $X_4$ is hydrogen, alkali metal (e.g. lithium, sodium) or halomagnesium (e.g. chloromagnesium, bromomagnesium, iodomagnesium).

The starting compound [I] may be prepared by a conventional method [e.g. Chemical Abstracts, 62, 16215 (1965); ibid., 63, 2952 (1966); J. Pharm. Soc. Japan, 74, 426 (1954)] or any such similar method.

The reaction is carried out by treating the compound [II] with the reagent [III] in the presence of a condensing agent such as a Lewis acid (e.g. titanium chloride, aluminum chloride, ferric chloride, boron chloride, tin chloride, zinc chloride, zirconium chloride, arsenic chloride, antimony chloride), preferably in a solvent (e.g. benzene, toluene, xylene, hexane). When the reagent [III] is a liquid, it may also serve as a solvent. The reaction temperature is not restricted to a particular temperature. The reaction is often carried out at room temperature or upon heating.

The application of the above fundamental procedure may be unsuitable for the preparation of some compounds, because of reasons such as poor yields, unavailability of the starting compounds, or because of the expense of the reagent. In such cases, an alternative procedure may be adopted.

One of the alternative procedures is shown in the following scheme:

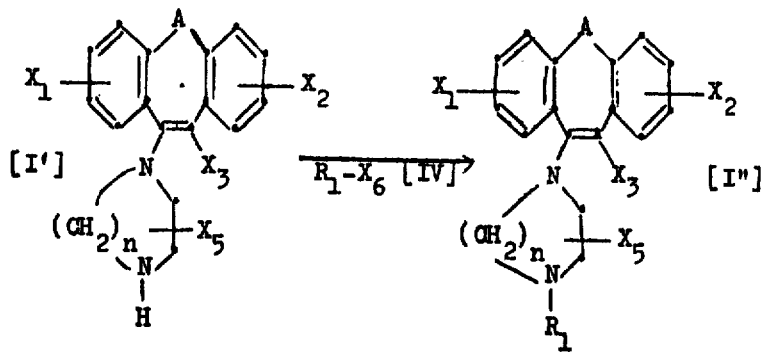

wherein A, $X_1$, $X_2$ and $X_3$ are each as defined above, $X_5$ is hydrogen or one or two methyl group, $X_6$ is a reactive ester residue such as halogen (e.g. chlorine, bromine, iodine), sulfuric acid residue or sulfonic ester residue (e.g. methanesulsulfonyloxy, toluenesulfonyloxy), $R_1$ is lower alkyl (e.g. methyl, ethyl, propyl), lower alkenyl (e.g. allyl, butenyl), lower alkynyl (e.g. propargyl), lower alkanoyl (e.g. acetyl, propionyl), lower alkoxycarbonyl (e.g. methoxycarbonyl, ethoxycarbonyl), hydroxy(lower)alkyl (e.g. hydroxyethyl, hydroxypropyl), lower alkoxy(lower)alkyl (e.g. methoxyethyl, ethoxyethyl, methoxypropyl), lower alkanoyl(lower)alkyl (e.g. acetylmethyl, acetylethyl, propionylethyl, propionylbutyl), lower alkanoyloxy(lower)alkyl (e.g. acetyloxyethyl, acetyloxypropyl), alkoxycarbonyl(lower)alkyl (e.g. methoxycarbonylmethyl, ethoxycarbonylethyl, methoxycarbonylpropyl), hydroxy(lower)alkoxy(lower)alkyl (e.g. hydroxymethoxymethyl, hydroxyethoxyethyl), carbamoyl(lower)alkyl (e.g. carbamoylmethyl, carbamoylethyl), phenyl(lower)alkyl (e.g. benzyl, phenethyl), phenoxy(lower)alkyl (e.g. phenoxymethyl, phenoxyethyl), phenyl(lower)alkoxy(lower)alkyl (e.g. benzyloxymethyl, benzyloxyethyl), benzoyloxy(lower)alkyl (e.g. benzoyloxymethyl, benzoyloxyethyl) or phenyl(lower)alkanoyloxy(lower)alkyl (e.g. phenacetylethyl, phenacetylpropyl), in which the phenyl group may not have more than three halogen atoms (e.g. chlorine, bromine, iodine), lower alkyl groups (e.g. methyl, ethyl, propyl) and/or lower alkoxy groups (e.g. methoxy, ethoxy, propoxy and n is either 2 or 3.

The reaction is carried out by treating the compound [I'] with the reagent [IV] in the presence of a basic material such as alkali metal (e.g. sodium, potassium, lithium) or alkaline earth metal (e.g. calcium), their hydroxide, hydride, amide, alkoxide or carbonate or an organic tertiary amine (e.g. pyridine, triethylamine, dimethylaniline), preferably in a solvent (e.g. methanol, ethanol, ether, benzene, acetone, dimethylformamide, diemthylsulfoxide). The reaction temperature is dependent upon the starting compound [I'], the reagent [IV], the basic material and the solvent employed. The reaction is usually carried out at a temperature around the boiling point of the solvent.

Another alternative procedure is shown in the following scheme:

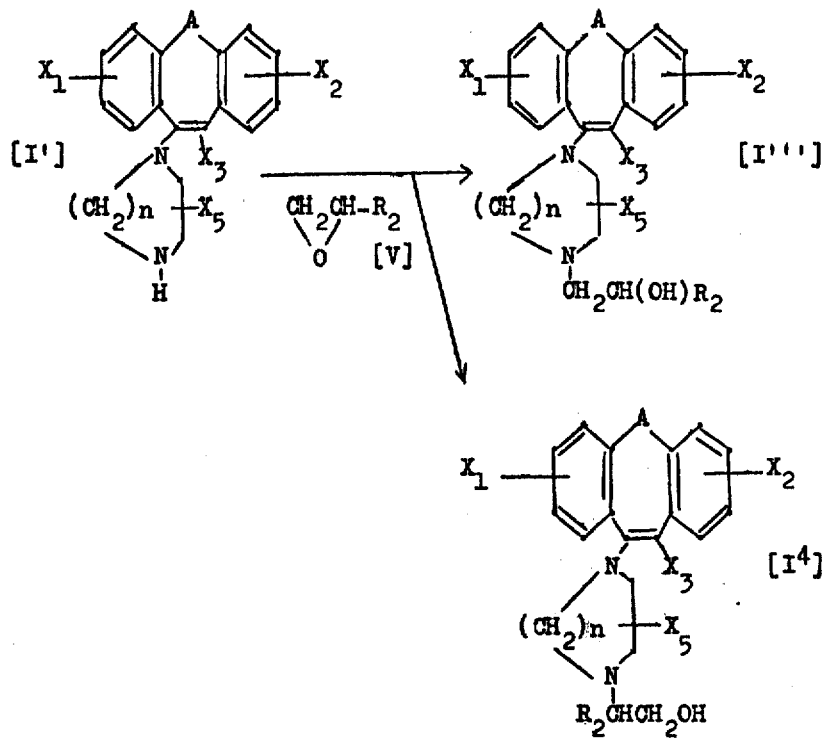

wherein A, $X_1$, $X_2$, $X_3$, $X_5$ and $n$ are each as defined above and $R_2$ is hydrogen or lower alkyl (e.g. methyl, ethyl, propyl).

The reaction is carried out by treating the compound [I'] with the reagent [V], usually in a solvent (e.g. methanol, ethanol, acetone, chloroform, dioxane, n-hexane, benzene, toluene, xylene). The reaction product is the compound [I'''] contaminated with the compound [I⁴] and readily separated into each component by a conventional separation procedure.

Another alternative procedure is shown in the following scheme:

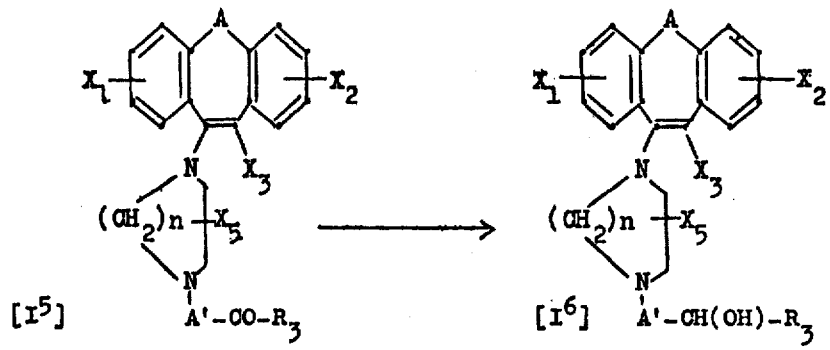

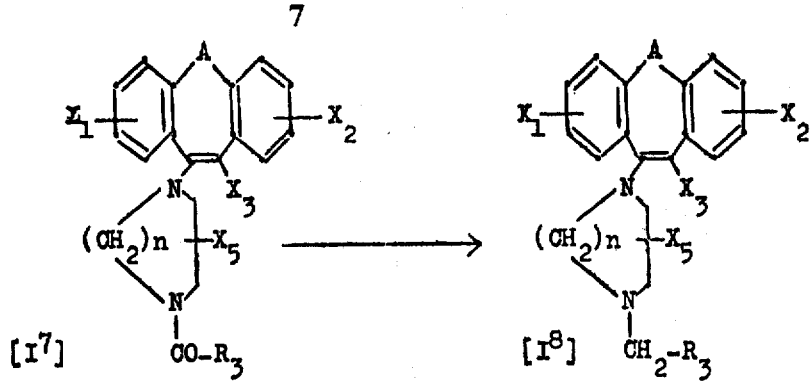

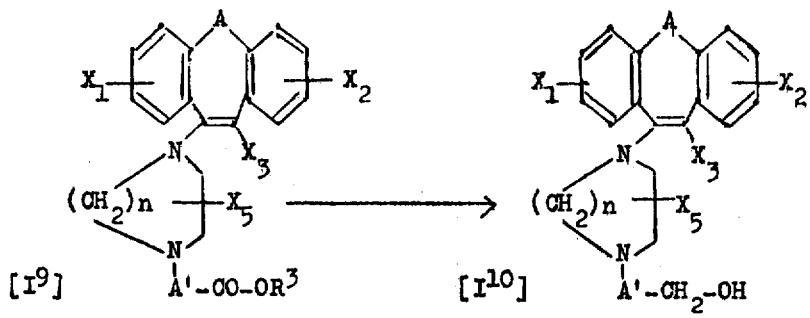

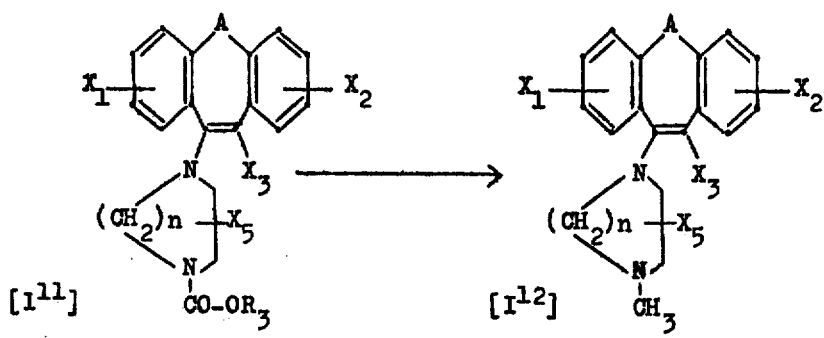

wherein A, $X_1$, $X_2$, $X_3$, $X_5$ and n are each as defined above, A' is lower alkylene (e.g. methylene, ethylene, propylene, trimethylene) and $R_3$ is lower alkyl (e.g. methyl, ethyl, propyl, isopropyl, butyl).

The reaction is executed by treating the compound [$I^5$], [$I^7$], [$I^9$] or [$I^{11}$] with a reducing agent such as alkali metal aluminum hydride (e.g. lithium aluminum hydride, calcium aluminum hydride, potassium aluminum hydride) in a solvent (e.g. tetrahydrofuran, ether, dioxane, N-methylmorpholine), usually at room temperature or around the boiling point of the solvent.

A further alternative procedure is shown in the following scheme:

wherein $X_1$, $X_2$, $X_3$, $X_5$, A and n are each as defined above, A" is lower alkylene (e.g. methylene, ethylene, propylene, trimethylene) and $R_4$ is lower alkyl (e.g. methyl, ethyl, propyl, isopropyl, butyl), phenyl or phenyl(lower)alkyl (e.g. benzyl, phenethyl), the phenyl group having no more than three halogen atoms, lower alkyl groups and/or lower alkoxy groups.

The reaction is carried out by treating the compound [$I^{13}$] with the reagent [IV] or its reactive derivative at the carboxyl group in a solvent (e.g. ether, acetone, dioxane, acetonitrile, chloroform, ethylene chloride, tetrahydrofuran, ethyl acetate, pyridine), if needed, in the presence of a basic material such as alkali hydrox-

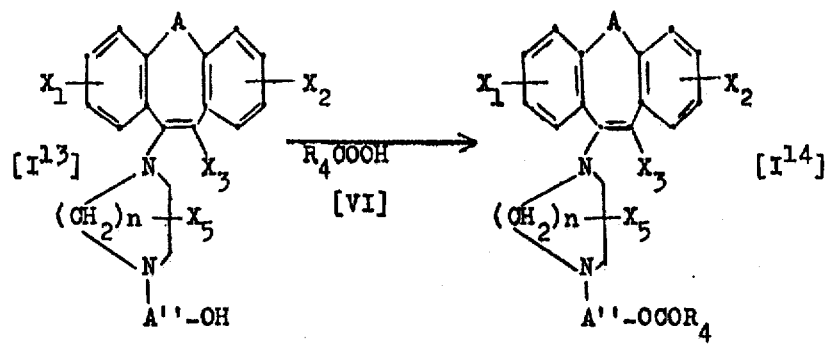

ide (e.g. sodium hydroxide, potassium hydroxide), alkali carbonate (e.g. sodium carbonate, potassium carbonate) alkali bicarbonate (e.g. sodium bicarbonate, potassium bicarbonate), trialkylamine (e.g. triethylamine, tripropylamine) or pyridine base (e.g. pyridine, picoline, lutidine). Examples of the reactive derivative of the reagent [VI] include acid halide, acid anhydride, amide, ester.

A still further procedure is shown in the following scheme:

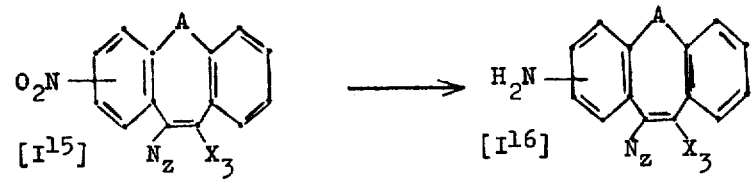

wherein A, $X_3$ and $N_z$ are each as defined above.

The reaction is carried out by treating the compound ($I^{15}$) with a reducing agent such as the combination of an organic acid (e.g. acetic acid) and a metal (e.g. zinc, iron) in a solvent (e.g. methanol, ethanol, ether, acetic acid), or subjecting said compound to catalytic reduction in the presence of a catalyst (e.g. platinum oxide, palladium oxide, Raney nickel) in a solvent (e.g. methanol, ethanol, ether, dioxane).

Compound (I) prepared in the above described manner, may be converted into its acid salt or quaternary ammonium salt by a conventional method. Examples of the salts include mineral acid salts (e.g. hydrochloride, sulfate, nitrate, phosphate), organic acid salts (e.g. acetate, propinate, succinate, oxalate, maleate, tartrate, fumalate, citrate, phenolphthalin salt) and quaternary ammonium salts with lower alkyl halides (e.g. methochloride, methobromide, methiodide, ethochloride, ethobromide, ethiodide).

As stated above, the compounds (I) and their salts show psychotropic and neurotropic activity such as central nervous system depressing activity, antihistaminic activity, analgesic activity, antiemetic activity and spasmolytic activity. Some of the test results by which said activities are evidenced are shown below.

TEST 1

Sleeping time prolongation

Groups of ICR-JCL strain male mice, each group consisting of 12 animals, received an aqueous solution or a 0.5% CMC suspension of the test compound by a subcutaneous method. Thirty minutes thereafter, each animal was given intraperitoneally 90 mg/kg of methylhexabital sodium. The duration of sleep was measured, and the $ED_{50}$ value was calculated by the Litchfield-Wilcoxon method taking as 100 percent the three time prolongation compared with the control.

The results are shown in Table 1.

Table 1

| Test compound | $ED_{50}$ (mg/kg) |
|---|---|
| 10-(4-Methyl-1-piperazinyl)-dibenzo[b,f]thiepin | 0.13 |
| 10-(4-Methyl-1-piperazinyl)-dibenz[b,f]oxepin | 0.26 |
| 8-Chloro-10-(4-methyl-1-piperazinyl)-dibenzo[b,f]thiepin | 0.17 |
| 8-Chloro-10-(4-methyl-1-piperazinyl)-dibenz[b,f]oxepin | 0.32 |
| 8-Chloro-10-[4-(2-hydroxyethyl)-1-piperzinyl]dibenzo[b,f]thiepin | 0.25 |
| 10-[4-(2-Hydroxyethyl)-1-piperazinyl]-dibenzo[b,f]thiepin | 0.4 |
| 8-Chloro-10-[4-(2-hydroxyethyl)-1-piperazinyl]dibenz[b,f]oxepin | 0.5 |
| Chlorpromazine | 0.84 |

TEST 2

Apomorphine antagonism test in rat a. Groups of SD-JCL strain male rats, each group consisting of 10 animals, received an aqueous solution or a 0.5% CMC suspension of the test compound by a subcutaneous route. Thirty minutes after a dose of the test compound under investigation, each rat received an intraperitoneal injection of 1.0 mg/kg of apomorphine hydrochloride. After 10, 20 and 30 minutes the animals were observed for several minutes by an observer. Absence of the typical growing movements occurring after injection of apomorphine was interpreted as a test compound effect (positive effect). The $ED_{50}$ value was calculated from the mean positive percent at each dose level by the Litchfield-Wilcoxon method.

b. The test was carried out as described above but an aqueous solution of apomorphine was intravenously administered to each rat at a dose of 1.25 mg/kg. The $ED_{50}$ value was calculated as above.

The results are shown in Table 2.

Table 2

| Test compound | $ED_{50}$ (mg/kg) | |
|---|---|---|
| | (a) | (b) |
| 10-(4-Methyl-1-piperazinyl)-dibenzo[b,f]thiepin | 0.84 | — |
| 10-(4-Methyl-1-piperazinyl)-dibenz[b,f]oxepin | 2.1 | — |
| 8-Chloro-10-(4-methyl-1-piperazinyl)-dibenzo[b,f]thiepin | 0.10 | — |
| 8-Chloro-10-(4-methyl-1-piperazinyl)-dibenz[b,f]oxepin | 0.04 | 0.28 |
| 10-[4-(2-Hydroxyethyl)-1-piperazinyl]-dibenzo[b,f]thiepin | — | 0.53 |
| 8-Chloro-10-[4-(2-hydroxyethyl)-1-piperazinyl]dibenz[b,f]oxepin | — | 0.22 |
| Chlorpromazine | 0.74 | 6.8 |

TEST 3

Depression of conditioned avoidance response

As the test animals, SD-JCL strain male rats were conditioned so as to produce more than 90% response. The rats were administered the test compound by a subcutaneous or oral route and received white noise as conditioned stimulus and electroshock as unconditioned stimulus. The conditioned avoidance response was observed at intervals from 30 to 60 minutes after the administration. This was compared with the control carried out on the same animals during the preceding day to calculate the depression rate, from which the $ED_{50}$ value was determined by graphing the mean depression rate at each dose level.

The results are shown in Table 3.

Table 3

| Test compound | $ED_{50}$ (mg/kg) | |
|---|---|---|
| | Subcutaneous | Oral |
| 10-(4-Methyl-1-piperazinyl)-dibenzo[b,f]thiepin | 0.25 | 2.0 |
| 8-Chloro-10-(4-methyl-1-piperazinyl)-dibenzo[b,f]thiepin | 0.054 | 1.06 |
| 8-Chloro-10-(4-methyl-1-piperazinyl)-dibenz[b,f]oxepin | 0.055 | 0.24 |
| Chlorpromazine | 0.45 | 5.74 |

TEST 4

Acute toxicity

The test compound was subcutaneously administered to groups of dd strain male mice, each group consisting of 10 animals. Death was observed for 3 days after administration, and the $LD_{50}$ value was calculated according to the Litchfield-Wilcoxon method.

The results are shown in Table 4.

Table 4

| Test compound | $LD_{50}$ (mg/kg) |
| --- | --- |
| 10-(4-Methyl-1-piperazinyl)dibenzo[b,f]thiepin | 560 |
| 10-(4-Methyl-1-piperazinyl)dibenz[b,f]oxepin | 330 |
| 8-Chloro-10-(4-methyl-1-piperazinyl)dibenzo[b,f]thiepin | 500 |
| 8-Chloro-10-(4-methyl-1-piperazinyl)dibenz[b,f]oxepin | 275 |
| Chlorpromazine | 92 |

Although the compounds [I] generally have the above useful activities, the following compounds are particularly potent: 10-(4-methyl-1-piperazinyl)-dibenz[b,f]oxepin, 8-chloro-10-(4-methyl-1-piperazinyl)dibenz[b,f]oxepin, 10-[4-(2-hydroxyethyl)-1-piperazinyl]dibenz[b,f]oxepin, 8-chloro-10-[4-(2-hydroxyethyl)-1-piperazinyl]dibenz[b,f]oxepin, 10-(4-methyl-1-piperazinyl)dibenzo[b,f]thiepin, 8-chloro-10-(4-methyl-1-piperazinyl)dibenzo[b,f]thiepin, 10-[4-(2-hydroxyethyl)-1-piperazinyl]dibenzo[b,f]thiepin, 8-chloro-10-[4-(2-hydroxyethyl)-1-piperazinyl]-dibenzo[b,f]thiepin, etc.

Because of the possession of the above described activities, the compounds [I] and their non-toxic salts are useful as tranquilizers.

The compounds [I] and their non-toxic salts can be administered by conventional methods, with conventional types of unit dosages and with conventional pharmaceutical carriers to produce a tranquilizing effect in human beings.

Thus, they can be used in the form of pharmaceutical preparations, which contain them in admixture with a pharmaceutical organic or inorganic carrier material suitable for enteral or parenteral applications. Oral administration by the use of tablets, capsules or in liquid form, such as suspensions, solutions or emulsions, is particularly advantageous. When formed into tablets, the conventional binding and disintegrating agents used in therapeutic unit dosages can be employed. Examples of binding agents include glucose, lactose, gum acacia, gelatin, mannitol, starch paste, magnesium trisilicate and talc. Examples of disintegrating agents include corn starch, keratin, colloidal silica and potato starch. When administered as liquids the conventional liquid carriers can be used.

The unit dosage or therapeutically effective quantity of the compounds (I) and their non-toxic salts for human beings can vary over wide limits such as about 0.1 milligram to 50 milligrams. The upper limit is limited only by the degree of effect desired and economic considerations. For oral administration it is preferable to employ about 1 milligram to about 10 milligrams of the therapeutic agent per unit dosage. Animal experiments indicate that about 1 to 10 milligram dosages administered orally four times daily, as needed, will provide a preferred daily dosage. Of course, the dosage of the particular therapeutic agent used can vary considerably, depending on the age of the patient and the degree of therapeutic effect desired. Each unit dosage form of the novel therapeutic compounds can contain from about 5% to 95% of the novel therapeutic agents by weight of the entire composition, with the remainder comprising conventional pharmaceutical carriers. The term "pharmaceutical carrier" is intended to include non-therapeutic materials which are conventionally used with unit dosage and includes fillers, diluents, binders, lubricants, disintegrating agents and solvents. It is possible, however, to administer the novel therapeutics, i.e. the pure compounds, without the use of a pharmaceutical carrier.

Practical and presently preferred embodiments of this invention are illustratively shown in the following examples.

EXAMPLE 1

A. A solution of 4.54 g of dibenzo[b,f]thiepin-10(11H)-one and 6.00 g of 1-methylpiperazine is about 80 ml of n-hexane was stirred in a nitrogen atmosphere while cooling. A solution of 1.9 g of titanium tetrachloride in 50 ml of n-hexane was added to the above described solution over a 40 minute period. The resulting mixture was stirred at room temperature for 1 hour and heated at reflux for 48 hours. The reaction mixture was filtered. The collected material was washed with n-hexane. The filtrate and the washings were combined together and concentrated. The residue was chromatographed on alumina and eluted with benzene. The eluate was concentrated to give 3.6 g of 10-(4-methyl-1-piperazinyl) dibenzo-[b,f]thiepin. Oxalate, M.P. 233°C (decomp.). Maleate, melting point 221°C (decomp.).

B. A solution of 3.8 g of titanium tetrachloride in 50 ml of anhydrous benzene was added dropwise to a solution of 9.1 g of dibenzo[b,f]thiepin-10(11H)-one and 12.2 g of 1-methylpiperazine in 200 ml of anhydrous benzene. The addition took place with continual stirring and cooling. The reaction mixture was stirred at room temperature for 1 hour and heated at reflux for 15 hours. The reaction mixture was then filtered. The collected material was washed with benzene. The filtrate and the washings were combined together and concentrated. The resulting oily substance was allowed to stand overnight, and the solidified material was recrystallized from ethanol to give 8.5 g of 10-(4methyl-1-piperazinyl)dibenzo[b,f]-thiepin. M.P. 109° to 112°C. Oxalate, melting point 233°C (decomp.).

C. A solution of 200 mg of titanium tetrachloride in 5 ml of anhydrous benzene was added dropwise to a cooled solution of 500 mg of 8-methyldibenzo[b,f]thiepin-10(11H)-one and 1.0 g of 1-methylpiperazine in 10 ml of anhydrous benzene. The addition took place over a 40 minute period attended by stirring and cooling in nitrogen gas. The resultant mixture was stirred at the same temperature for a period of time and then heated at reflux for 20 hours. The reaction mixture was cooled and filtered. The filtrate was dried and concentrated. The residue was chromatographed on alumina and eluted with benzene and then ethanol. The ethanol eluate was concentrated to give 400 mg of 8-methyl-10-(4-methyl-1-piperazinyl)dibenzo[b,f]thiepin. Maleate, melting point 227°C (decomp.).

D. A solution of 1.9 g of titanium tetrachloride in 19 ml of benzene was added to a cooled solution of 4.5 g of dibenzo[b,f]-thiepin-10(11H)-one in 100 ml of benzene. After addition of 6.1 g of 1-methylpiperazine, the resulting mixture was stirred at room temperature for 1 hour and heated at reflux for 15 hours. The reaction mixture was filtered. The collected material was washed with benzene. The filtrate and the washings were combined together and concentrated to give 10-(4-methyl-1-piperazinyl)dibenzo[b,f]-thiepin. Oxalate, melting point 233°C (decomp.).

E. 4.5 g of dibenzo[b,f]thiepin-10(11H)-one in 20 ml of benzene was added dropwise to a mixture of 6.1 g of 1-methylpiperazine and 1.9 g of titanium chloride in 100 ml of benzene. The reaction mixture was stirred at room temperature for 1 hour and heated at reflux for 15 hours. The reaction mixture was filtered, and the washings were combined together and concentrated to give 10(4-methyl-1-piperazinyl)dibenzo[b,f]-thiepin. Maleate, melting point 221°C.

F. A solution of 0.57 g of antimony trichloride in 15 ml of anhydrous benzene was added dropwise with stirring to a solution of 1.13 g of dibenzo[b,f]thiepin-10(11H)-one and 4.5 g of 1-methylpiperazine in 50 ml of anhydrous benzene. The reaction mixture was stirred at room temperature for 2.5 hours and heated at reflux for 6.5 hours with stirring. The precipitate was removed by filtration, and the filtrate was washed with water and concentrated. The residue was dissolved in ethanol and treated with maleic acid. The precipitate was collected by filtration and recrystallized from ethanol to give 10-(4-methyl-1-piperazinyl)-dibenzo[b,f]-thiepin maleate. Melting point 218° to 219°C (decomp.).

G. A solution of about 0.6 g of zirconium tetrachloride in 15 ml of anhydrous benzene was added dropwise to a cooled solution of 1.13 g of dibenzo[b,f]thiepin-10(11H)-one and 4.5 g of 1-methylpiperazine in 50 ml of anhydrous benzene. The reaction mixture was stirred at room temperature for 2.5 hours, heated at reflux with stirring for an additional 6.5 hours and then treated as described in (F) to give 0.1 g of 10-(4-methyl-1-piperazinyl)-dibenzo[b,f]thiepin maleate, melting point 219° to 220°C (decomp.).

H. 0.6 g of 4-methylpiperazine in 6 ml of benzene was added to phenyl lithium which was prepared from 250 mg of lithium metal and 2.83 g of phenyl bromide in 25 ml of dry ether in accordance with the conventional method. The reaction mixture was stirred for 30 minutes at room temperature and thereafter the solvent was distilled off. The resultant residue was dissolved into 25 ml of dry benzene and this solution was added to 1.1 g of dibenzo[b,f]thiepin-10(11H)-one. This was followed by the dropwise addition of 0.29 g of titanium tetrachloride in 10 ml of benzene. The mixture was stirred for 30 minutes at room temperature and then heated under reflux for 17 hours. After cooling, the reaction mixture was diluted with ether. The precipitating substance was filtered off, and the ether layer was washed with water and dried to give 10-(4-methyl-1-piperazinyl)dibenzo[b,f]thiepin as oil. Maleate, M.P., 221°C (decomp.).

I. A solution of 1.9 g of titanium tetrachloride in 10 ml of benzene was added dropwise over a one-hour period to a solution of 4.2 g of dibenz[b,f]oxepin-10(11H)-one and 10.0 g of 1-methylpiperazine in 10 ml of benzene kept below 10°C. The resulting mixture was stirred at room temperature for 1 hour and heated at reflux for 20 hours with stirring. The precipitate was removed by filtration, and the filtrate was concentrated under reduced pressure. The residue was crystallized from petroleum benzin to give 4.0 g of 10-(4-methyl-1-piperazinyl)dibenz[b,f]oxepin. M.P. 109° to 110°C. Maleate, M.P. 201° to 202°C (decomp.).

Other compounds which can be prepared in the substantially same manner as above include: 10-(1-piperazinyl)dibenzo[b,f]thiepin (maleate), M.P. 198° to 199°C (decomp.); 8-chloro-10-(1-piperazinyl)-dibenzo[b,f]thiepin, I.R. 3330 cm$^{-1}$ (=NH), 1610 cm$^{-1}$ (>C=C<); 2-chloro-10-(4-methyl-1-piperazinyl)-dibenzo[b,f]thiepin (maleate), M.P. 239°C (decomp.); 2-trifluoromethyl-10-(1-piperazinyl)-dibenzo[b,f]thiepin; 7-trifluoromethyl-10-(1-piperazinyl)-dibenzo[b,f]thiepin; 8-trifluoromethyl-10-(1-piperazinyl)-dibenzo[b,f]thiepin; 2-trifluoromethyl-10-(4-methyl-1-piperazinyl-dibenzo[b,f]thieipin; 7-trifluoromethyl-10-(4-methyl-1-piperazinyl)dibenzo[b,f]thiepin (maleate), M.P. 233° to 234°C; 8-trifluoromethyl-10-(4-methyl-1-piperazinyl)dibenzo[b,f]thiepin; 8-nitro-10-(1-piperazinyl)dibenzo[b,f]thiepin; 8-nitro-10-(4-methyl-piperazinyl)dibenzo[b,f]thiepin; 8-dimethylsulfamoyl-10-(1-piperazinyl)dibenzo[b,f]thiepin; 8-chloro-10-(4-allyl-1-piperazinyl) dibenzo[b,f]thiepin; 8-chloro-10-[4-(2-propagyl)-1-piperazinyl]dibenzo[b,f]thiepin (maleate), M.P. 189° to 189.5°C; 8-chloro-10-(4-acetyl-1-piperazinyl)dibenzo[b,f]thiepin, M.P. 198.5° to 199.5°C; 8-chloro-( 4-ethyl-1-piperazinyl)dibenzo [b,f]thiepin (maleate), M.P. 232°C; 8-chloro-10-(4-methyl-1-piperazinyl)dibenzo[b,f]thiepin (maleate), M.P. 234°C; 8-methoxy-10-(1-piperazinyl)dibenzo[b,f]thiepin, M.P. 138° to 139.5°C; 8-methoxy-10-(4-methyl-1-piperazinyl)-dibenzo[b,f]thiepin (maleate), M.P. 221° to 222°C (decomp.); 8-methoxy-10-(4-propyl-1-piperazinyl)-dibenzo[b,f]thiepin; 10-(4-benzyl-1-piperazinyl)dibenzo[b,f]thiepin, M.P. 136° to 137°C; (maleate), M.P. 231°C (decomp.); 10-[4-(3-benzyloxypropyl)-1-piperazinyl]dibenzo[b,f]thiepin (maleate), M.P. 188° to 189°C (decomp.); 10-piperidinodibenzo[b,f]thiepin, M.P. 118° to 119°C; 10-(2,5-dimethyl-1-piperazinyl)-dibenzo[b,f]thiepin (maleate), M.P. 241°C (decomp.); 8-chloro-10-(2,5-dimethyl-1-piperazinyl) dibenzo[b,f]thiepin, M.P. 244°C (decomp.); 8-methyl-10-(2,4,5-trimethyl-1-piperazinyl)dibenzo[b,f]thiepin; 10-morpholinodibenzo[b,f]thiepin, M.P. 136° to 138°C; 10-(4-methyl-1-diazipinyl)dibenzo[b,f]thiepin (maleate), M.P. 193°C (decomp.); 10-(1-piperazinyl)-dibenz[b,f]oxepin, I.R. 3300 cm$^{-1}$ (>NH), 1608 cm$^{-1}$ (>C=C<); 8-chloro-10-(1-piperazinyl) dibenz[b,-f]oxepin, M.P. 181.5° to 182.5°C; 8-chloro-10-(4-methyl-1-piperazinyl)dibenz[b,f]oxepin (maleate), M.P. 187°C (decomp.); 8-methylthio-10-(4-methyl-1-piperazinyl)dibenz[b,f]oxepin (maleate), M.P. 198° to 199°C (decomp.); 8-methylthio-10-(1-piperazinyl)dibenz [b,f,]oxepin (maleate), M.P. 202° to 203°C (decomp.); 8-methoxy-10-(1-piperazinyl)dibenz[b,f]oxepin, M.P. 157° to 159°C; (maleate), M.P. 191.5° to 192°C (decomp.); 8-methoxy-10-(4-propyl-1-piperazinyl)dibenz[b,f]oxepin; 8-ethyl-10-(4-methyl-1-piperazinyl)dibenz[b,f]oxepin (maleate), M.P. 201° to 202°C (decomp.); 8-methanesulfonyl-10-(1-piperazinyl)dibenz[b,f]oxepin (maleate), M.P. 225°C (decomp.); 8-ethyl-10-(1-piperazinyl)dibenz[b,f]oxepin, I.R. 3350 cm$^{-1}$ (>NH), 1613 cm$^{-1}$ (>C=C<); 8-methanesulfonyl-10-(4-methyl-1-piperazinyl)dibenz[b,f]oxepin (maleate), M.P. 205° to 206°C; 8-chloro-10-(4-allyl-1-piperazinyl)dibenz[b,f]oxepin (maleate), M.P. 178° to 180°C (decomp.); 8-methoxy-10-(4-allyl-1-piperazinyl) dibenz[b,f]oxepin; 8-ethyl-10-(4-allyl-1- piperazinyl)dibenz [b,f]oxepin; 8-chloro-10-(4-propargyl-1-piperazinyl)dibenz[b,f]oxepin, M.P. 147° to 148°C; 8-bromo-10-(4-methyl-1-piperazinyl)-dibenz[b,f]oxepin, M.P. 110° to 111°C (decomp.); 8-nitro-10-(4-methyl-1-piperazinyl)dibenz[b,f]oxepin, M.P. 163° to 164°C; 8-nitro-10-(1-piperazinyl)-dibenz[b,f]oxepin (maleate), M.P. 201° to 202°C (decomp.); 8-chloro-10-[4-(4'-methoxyphenyl)-1-piperazinyl]dibenz[b,f]oxepin, M.P. 164° to 166°C; 8-chloro-10-[4-(3', 4'-dimethoxyphenethyl)-1-piperazinyl]dibenz[b,f]oxepin (maleate), M.P. 188.5° to 189°C; 8-trifluoromethyl-10-(1-piperazinyl)-dibenz[b,f]oxepin; 8-trifluoromethyl-10-(4-methyl-1-piperazinyl)dibenz[b,f]oxepin; 8-trifluoromethyl-10-(4-ethyl-1-piperazinyl)dibenz[b,f]oxepin; 8-trifluoromethyl-10-(4-propyl-1-piperazinyl)dibenz[b,f]oxepin; 8-trifluoromethyl-10-[4-(3',4'-dimethoxyphenethyl)-1-piperazinyl)dibenz[b,f]oxepin; 8-dimethylsulfamoyl-10-(1-piperazinyl)dibenz[b,f]oxepin (maleate), M.P. 194° to 196°C (decomp.); 8-dimethylsulfamoyl-10-(4-methyl-1-piperazinyl) dibenz[b,f]oxepin, M.P. 189° to 190°C; 8-dimethylsulfamoyl-10-(4-propyl-1-piperazinyl)dibenz[b,f]oxepin; 8-dimethylsulfamoyl-10-[4-(4'-chlorophenyl)-1-piperazinyl]-dibenz[b,f]oxepin; 8-acetamido-10-(4-methyl-1-piperazinyl)dibenz[b,f]oxepin; 5-methyl-10-(4-methyl-1-piperazinyl)-5H-dibenz[b,f]azepine (maleate), M.P. 165°C; 5-methyl-8-chloro-10-(4-methyl-1-piperazinyl)dibenz[b,f]azepine; 5-methyl-10-(1-piperazinyl)dibenz[b,f]azepine; 5-methyl-8-chloro-10-(4-methyl-b 1-piperazinyl)dibenzo[a,d]cycloheptene, M.P. 108° to 109°C; (maleate), M.P. 229° to 230°C (decomp.); 5-methyl-10-(1-piperazinyl)dibenz[a,d]cycloheptene (maleate), M.P. 198°C (decomp.); 10-morpholino-11-methyldibenzo[b,f]thiepin, M.P. 146° to 147.5°C; 10-(1-piperazinyl)-11-methyldibenzo[b,f]-thiepin; 10-(4-methyl-1-piperazinyl)-11-methyldibenzo[b,f]thiepin, M.P. 126° to 126.5°C; (maleate), M.P. 199° to 201°C; 10-(4-methyl-1-piperazinyl)-11-benzyldibenzo[b,f]thiepin, M.P. 97° to 98°C; (maleate), M.P. 208° to 209°C (decomp.); (hydrochloride), M.P. 289°C (decomp.); 10-(1-piperazinyl)-11-methyldibenz[b,f]oxepin; 8-chloro-10-(4-methyl-1-piperazinyl)-11-methyldibenz[b,f]oxepin (maleate), M.P. 218°C (decomp.); 8-chloro-10-[4-(3',4'-dichlorobenzyl-1-piperazinyl]dibenz[b,f]oxepin, M.P. 174° to 175.5°C; 8-chloro-10-[4-(3',4'-dimethoxyphenethyl)-1-piperazinyl]dibenz[b,f]oxepin (maleate), M.P. 188.5° to 189.5°C; 8-chloro-10-(4-acetyl-1-piperazinyl)dibenz[b,f]oxepin, M.P. 190° to 191°C; 8-methoxy-10-(2,5-dimethyl-1-piperazinyl)dibenz[b,f]oxepin (maleate), M.P. 240° to 241°C; 8-methoxy-10-(3,4,5-trimethyl-1-piperazinyl)dibenz[b,f]oxepin; 8-methoxy-10-(2,4,5-trimethyl-1-piperazinyl)-dibenz[b,f]oxepin (maleate), M.P. 100° to 101°C (decomp.); 8-ethyl-10-(2,5-dimethyl-1-piperazinyl)-dibenz[b,f]oxepin; 8-methanesulfonyl-10-(2,5-dimethyl-1-piperazinyl)dibenz[b,f]oxepin; 8-bromo-10-morpholinodibenz[b,f]oxepin, M.P. 158.5° to 160°C; 10-(1-piperazinyl)dibenz[b,f]thiepin, M.P. 134°C; (maleate), 198° to 199°C (decomp.); 8-methoxy-10-(4-methyl-1-piperazinyl)dibenz[b,f]oxepin (maleate), M.P. 202° to 203.5°C (decomp.); 8-chloro-10-(4-propyl-1-piperazinyl)dibenz[b,f]oxepin (maleate), M.P. 176.5° to 178°C (decomp.); 10-(4-carbamoylmethyl-1-piperazinyl)dibenzo[b,f]thiepin, M.P. 211° to 212°C; 8-chloro-10-(4-acetoxyethyl-1-piperazinyl)-dibenz[b,f]thiepin (maleate), M.P. 199° to 199.5°C; 8-chloro-10-(2,4,5-trimethoxy-1-piperazinyl)-dibenz[b,f]oxepin, M.P. 100° to 102°C; 8-chloro-10-(4-ethyl-1-piperazinyl)dibenz[b,f]oxepin (maleate), M.P. 186° to 188°C (decomp.); 7-trifluoromethyl-10-(4-methyl-1-piperazinyl)dibenz[b,f]oxepin (maleate), M.P. 233° to 234°C (decomp.); 8-methyl-10-(4-methyl-1-piperazinyl)dibenzo[b,f]thiepin (maleate), M.P. 227°C; 8-methylthio-10-(4-methyl-1-piperazinyl)-dibenzo[b,f]thiepin (maleate), M.P. 193° to 194°C (decomp.); 8-amino-10-(1-piperazinyl)dibenz[b,f]oxepin, M.P. 191° to 192°C, etc.

EXAMPLE 2

A solution of 0.95 g of titanium tetrachloride in 3 ml of benzene was added dropwise to a cooled solution of 2.2 g of dibenzo[b,f]thiepin-10(11H)-one and 8.5 g of ethyl 1-piperazineacetate in 11 ml of benzene. The solution was stirred at 80° to 100°C for 17 hours. To the reaction mixture was added 100 ml of ether, and the precipitate was filtered off. The filtrate was washed with water several times and dried. After removal of the solvent, the residue was chromatographed on silicagel and eluted with benzene and then ether. The ether eluate was concentrated to yield 1.1 g of ethyl 4-(dibenzo[b,f]thiepin)-1-piperazineacetate as oil. I.R. 1740 cm$^{-1}$ (—COO—). Maleate, M.P. 164°C.

Other compounds which can be prepared in the substantially same manner as above include: ethyl 4-(8-chlorodibenzo[b,f]thiepin-10-yl)-1-piperazinecarboxylate; ethyl 4-(8-chlorobenzo[b,f]thiepin-10-yl)-1-piperazineacetate, I.R. 1740 cm$^{-1}$ (—COO—); ethyl 4-(8-chlorodibenzo[b,f]thiepin-10-yl)-1-piperazinepropionate (maleate), M.P. 183° to 184°C (decomp.); ethyl 4-(8-chlorodibenz[b,f]oxepin-10-yl)-1-piperazinecarboxylate, M.P. 137° to 139°C; ethyl-4-(dibenzo[b,f]oxepin-10-yl)-1-piperazineacetate, I.R. 1745 cm$^{-1}$ (—COO—); ethyl 4-(8-nitrodibenz[b,f]oxepin-10-yl)-1-piperazineacetate, M.P. 146.5° to 148°C; ethyl 4-(8-chlorodibenz[b,f]oxepin-10-yl)-1-piperazineisopropionate, M.P. 164° to 165.5°C; ethyl 2,5-dimethyl-4-(8-methoxydibenz[b,f]oxepin-10-yl)-1-piperazinecarboxylate, I.R. 1690 cm$^{-1}$, 1480 cm$^{-1}$, 1275 cm$^{-1}$; ethyl 4-(5-methyl-8-chlorodibenz[a,d]cycloheptene-10 -yl)-1-piperazineacetate, I.R. 2800 cm$^{-1}$ (—N=), 175 cm$^{-1}$ (—COO—); ethyl 4-(8-trifluoromethyldibenz[b,f]oxepin-10-yl)-1-piperazineacetate, ethyl 4-(8-methoxydibenzo[b,f]thiepin-10-yl)-1-piperazineacetate (maleate), M.P. 169°C (decomp.); ethyl 4-(8-methoxydibenzo[b,f]thiepin-10-yl)-1-piperazinepropionate (maleate), M.P. 159° to 159.5°C (decomp.); ethyl 4-(8-methoxydibenz[b,f]oxepin-10-yl)-1-piperazinepropionate (maleate), M.P. 170° to 171°C (decomp.); ethyl 4-(8-methoxydibenz[b,f]oxepin-10-yl)-1-piperazineacetate (maleate), M.P. 163°C (decomp.), etc.

EXAMPLE 3

A. A mixture of 100 mg of 10-(1-piperazinyl)dibenzo[b,f]thiepin, 100 mg of anhydrous potassium carbonate and 50 mg of α-chlorotoluene in 5 ml of anhydrous ethanol was heated at reflux for 4 hours. After filtration of the hot solution, the filtrate was evaporated under reduced pressure to dryness. The residue was extracted with ether, and ether was removed from the ethereal extract. The residue was recrystallized from ethanol to yield 10-(4-benzyl-1-piperazinyl)dibenzo[b,f]thiepin, M.P. 136° to 137°C. Maleate, M.P. 231°C (decomp.)

B. A mixture of 100 mg of 10-(1-piperazinyl)dibenzo[b,f]thiepin, 100mg of anhydrous potassium carbonate and 60 mg of 1-bromo-2-propanol in 5 ml of anhydrous ethanol was treated as in (A) to yield 10-[4-(2-hydroxypropyl)-1-piperazinyl]dibenzo[b,f]thiepin, M.P. 141° to 141.5°C. Maleate, M.P. 159° to 161°C.

C. A mixture of 300 mg of 10-(1-piperazinyl)dibenzo[b,f]thiepin, 150 mg of anhydrous potassium carbonate and 280 mg of 3-benzyloxypropyl iodide in 10 ml of anhydrous ethanol was treated as in (A) to yield 10-[4-(3-benzyloxypropyl)-1-piperazinyl]dibenzo[b,f]thiepin. Maleate, M.P. 186° to 186.5°C.

Other compounds which can be prepared in the substantially same manner as above include: 10-(4-carbamoylmethyl-1-piperazinyl)dibenzo[b,f]thiepin, M.P. 211° to 212°C; 8-chloro-10-(4-carbamoylmethyl-1-piperazinyl)dibenzo[b,f]thiepin; 10-[4-(2-hydroxyethyl)-1-piperazinyl]dibenzo[b,f]thiepin (maleate), M.P. 160° to 161°C (decomp.); 8-chloro-10-[4-(2-hydroxyethyl)-1-piperazinyl]dibenzo[b,f]thiepin, M.P. 138° to 139°C, (maleate), M.P. 196° to 198°C; 10-[4-(3-hydroxypropyl)-1-piperazinyl]dibenzo[b,f]thiepin, M.P. 137° to 138°C; 8-trifluoromethyl-10-[4-(2-hydroxyethyl)-1-piperazinyl]dibenzp[b,f]thiepin; 8-trifluoromethyl-10-[4-(3-hydroxypropyl)-1-piperazinyl]-dibenzo[b,f]thiepin; 8-dimethylsulfamoyl-10-[4-(2-hydroxyethyl)-1-piperazinyl]dibenzo[b,f]thiepin; 8-chloro-10-(4-acetoxyethyl-1-piperazinyl)dibenzo[b,f]thiepin (maleate), M.P. 199° to 199.5°C; 8-chloro-10-[4-(2-hydroxyethyl)-1-diazepinyl]dibenzo[b,f]thiepin; 8-chloro-10-(2,5-dimethyl-4-allyl-1-piperazinyl)dibenzo[b,f]thiepin; 8-chloro-10-(4-carbamoylmethyl-1-piperazinyl)dibenz[b,f]oxepin, M.P. 246°C; 8-dimethylsulfamoyl-10-(4-carbamoylmethyl-1-piperazinyl)-dibenz[b,f]oxepin; 8-chloro-10-[4-(2-hydroxyethyl)-1-piperazinyl]dibenz[b,f]oxepin, M.P. 117° to 119°C; 8-methoxy-10-[4-(2-hydroxyethyl)-1-piperazinyl]-dibenz[b,f]oxepin, M.P. 139° to 140°C; 8-ethoxy-10-[4-(2-hydroxyethyl)-1-piperazinyl]dibenz[b,f]oxepin; 8-trifluoromethyl-10-[4-(2-hydroxyethyl)-1-piperazinyl]dibenz[b,f]oxepin; 8-dimethylsulfamoyl-10-[4-(2-hydroxyethyl)-1-piperazinyl]dibenz[b,f]oxepin, M.P. 165° to 166°C; 8-methanesulfonyl-10-[4-(2-hydroxyethyl)-1-piperazinyl]dibenz[b,f]oxepin, M.P. 116° to 118°C; 8-nitro-10-[4-(2-hydroxyethyl)-1-piperazinyl]dibenz[b,f]oxepin, (maleate), M.P. 164° to 166°C; 8-ethyl-10-[4-(2-hydroxyethyl)-1-piperazinyl]dibenz[b,f]oxepin (maleate), M.P. 160°C; 8-chloro-10-[4-(3-hydroxypropyl)-1-piperazinyl]dibenz[b,f]oxepin, M.P. 149° to 150.5°C; 8-dimethylsulfamoyl-10-[4-(3-hydroxypropyl)-1-piperazinyl]-dibenz[b,f]oxepin; 8-trifluoromethyl-10-[4-(3-hydroxypropyl)-1-piperazinyl]dibenz[b,f]oxepin; 8-methanesulfonyl-10-[4-(3-hydroxypropyl)-1-piperazinyl]dibenz[b,f]oxepin; 8-chloro-10-[4-(2-hydroxypropyl)-1-piperazinyl]dibenz[b,f]oxepin (maleate), M.P. 178° to 179°C; 8-methoxy-10-[4-(2-hydroxypropyl)-1-piperazinyl]dibenz[b,f]oxepin,M.P.136° to 138°C; 8-nitro-10-[4-(2-hydroxypropyl)-1-piperazinyl]dibenz[b,f]oxepin, M.P. 200°C (decomp.); 8-ethyl-10-[4-(2-hydroxypropyl)-1-piperazinyl]dibenz[b,f]oxepin, M.P. 130° to 132°C; 8-chloro-10-[4-(1-methyl-2-hydroxyethyl)-1-piperazinyl]dibenz[b,f]oxepin, M.P. 164° to 165.5°C; 8-chloro-10-[4-(2-acetoxypropyl)-1-piperazinyl]-dibenz[b,f]oxepin, M.P. 165° to 167°C; 8-chloro-10-[4-(2-hydroxyethyl)-1-diazepinyl]dibenz[b,f]oxepin; 8-chloro-10-[4-(2-acetoxyethyl)-1-diazepinyl]dibenz[b,f]oxepin; ethyl 4-(8-chlorodibenz[b,f]oxepin-10-yl)-1-diazepinacetate; ethyl 2,5-dimethyl-4-(dibenz[b,f]oxepin-10-yl)-1-piperazinecarboxylate; 10-(4-carbamoylmethyl-1-piperazinyl)-11-methyl-dibenzo[b,f]thiepin; 10-(4-carbamoylmethyl-1-piperazinyl)-11-methyldibenzo[b,f]oxepin: 5-methyl-8-chloro-10-[4-(2-hydroxyethyl)-1-piperazinyl]dibenzo[a,d]cycloheptene (maleate), M.P. 209.5°C. (decomp.); 5-methyl-8-chloro-10-[4-(2-acetoxyethyl)-1-piperazinyl]dibenzo[a,d]cycloheptene; 10-(4-carbamoylmethyl-1-piperazinyl)dibenzo[a,d]cycloheptene; 2-chloro-10-(4-methyl-1-piperazinyl)dibenzo[b,f]thiepin (maleate), M.P. 239°C (decomp.); 2-trifluoromethyl-10-(4-methyl-1-piperazinyl)-dibenzo[b,f]thiepin; 7-trifluoromethyl-10-(4-methyl-1-piperazinyl)dibenzo[b,f]thiepin; 8-trifluoromethyl-10-(4-methyl-1-piperazinyl)dibenzo[b,f]thiepin; 8-trifluoromethyl-10-(4-methyl-1-piperazinyl)dibenzo[b,f]thiepin; 8-nitro-10-(4-methyl-1-piperazinyl)-dibenzo[b,f]thiepin; 8-chloro-10-(4-allyl-1-piperazinyl)dibenzo[b,f]thiepin; 8-chloro-10-[4-(2-propargyl-1-piperazinyl)]dibenzo[b,f]thiepin; 8-chloro-10-(4-ethyl-1-piperazinyl)dibenzo[b,f]thiepin; 8-chloro-10-(4-acetyl-1-piperazinyl)dibenzo[b,f]thiepin; 8-chloro-10-(4-methyl-1-piperazinyl)dibenzo[b,f]thiepin; 8-methoxy-10-(4-methyl-1-piperazinyl)dibenzo[b,f]thiepin; 8-methoxy-10-(4-propyl-1-piperazinyl)dibenzo[b,f]thiepin; 10-(4-benzyl-1-piperazinyl)dibenzo[b,f]thiepin; 8-methyl-10-(2,4,5-trimethyl-1-piperazinyl)dibenzo[b,f]thiepin; 10-(4-methyl-1-diazepinyl)dibenzo[b,f]thiepin; 10-(4-methyl-1-piperazinyl)dibenz[b,f]oxepin; 8-chloro-10-(4-methyl-1-piperazinyl)dibenz[b,f]oxepin; 8-methylthio-10-(4-methyl-1-piperazinyl)dibenz[b,f]oxepin; 8-methoxy-10-(4-methyl-1-piperazinyl)dibenz[b,f]oxepin; 8-methoxy-10-(4-propyl-1-piperazinyl)dibenz[b,f]oxepin; 8-ethyl-10-(4-methyl-1-piperazinyl)-dibenz[b,f]oxepin; 8-methanesulfonyl-10-(4-methyl-1-piperazinyl)dibenz[b,f]oxepin; 8-chloro-10-(4-allyl-1-piperazinyl)dibenz[b,f]oxepin; 8-methoxy-10-(4-allyl-1-piperazinyl)dibenz[b,f]oxepin; 8-ethyl-10-(4-allyl-1-piperazinyl)dibenz[b,f]oxepin; 8-chloro-10-(4-propargyl-1-piperazinyl)dibenz[b,f]oxepin; 8-bromo-10-(4-methyl-1-piperazinyl)dibenz[b,f]oxepin; 8-nitro-10-(4-methyl-1-piperazinyl)dibenz[b,f]oxepin; 8-chloro-10-[4-(3',4'-dimethoxyphenethyl)-1-piperazinyl)dibenz[b,f]oxepin; 8-chloro-10-[4-(3',4'-dichlorobenzyl-1-piperazinyl]dibenz[b,f]oxepin; 8-chloro-10-[4-(3',4'-dichlorophenethyl-1-piperazinyl]-dibenz[b,f]oxepin; 8-chloro-10-(4-acetyl-1-piperazinyl)dibenz[b,f]oxepin; 8-methoxy-10-(3,4,5-trimethyl-1-piperazinyl)dibenz[b,f]oxepin: 8-methoxy-10-(2,4,5-trimethyl-1-piperazinyl)dibenz[b,f]oxepin, M.P. 100° to 102°C; 5-methyl-10-(4-methyl-1-piperazinyl)-5H-dibenz[b,f]axepin; 5-methyl-8-chloro-10-(4-methyl-1-piperazinyl)dibenz[b,f]azepine; 5-methyl-8-chloro-10-(4-methyl-1-piperazinyl)dibenzo[a,d]cycloheptene; 10-(4-methyl-1-piperazinyl)-11-methyldibenzo[b,f]thiepin; 10-(4-methyl-1-piperazinyl)-11-benzyldibenzo[b,f]thiepin; 8-choro-10-(4-methyl-1-piperazinyl)-11-methyldibenz[b,f]oxepin; 10-(4-methyl-1-piperazinyl)dibenzo[b,f]thiepin (maleate), 221°C (decomp.); 8-methyl-10-(4-methyl-1-piperazinyl)dibenzo[b,f]thiepin (maleate), M.P. 227°C (decomp.); 8-chloro-10-(4-propyl-1-piperazinyl)dibenz[b,f]oxepin (maleate), M.P. 176.5° to 178°C (decomp.); ethyl 4-(dibenzo[b,f]thiepin-10-yl)-1-piperazineacetate (maleate), M.P. 164°C; ethyl 4-(8-chlorobenzo[b,f]thiepin-10-yl)-piperazineacetate, I.R. 1740 cm$^{-1}$ (—COO—); ethyl 4-(8- chlorodibenzo[b,f]thiepin-10-yl)-1-piperazinepropionate (maleate), M.P. 183° to 184°C; ethyl 4-dibenzo[b,f]oxepin-10-yl)-1-piperazinecetate, I.R. 1745 cm$^{-1}$ (—COO—); ethyl 4-(8-chlorodibenz[b,f]oxepin-10-yl)-1-piperazineisopropionate, M.P. 164° to 165.5°C; ethyl 4-(8-nitrodibenz[b,f]oxepin-10-yl)-1-diazepineacetate, M.P. 146.5° to 148°C; 8-chloro-10-(2,4,5-trimethylpiperazinyl)dibenz[b,f]oxepin, M.P. 100° to 102°C; 10-[4-(2-hydroxyethyl)-1-piperazinyl]-dibenz[b,f]oxepin (maleate), M.P. 168° to 170°C; 8-chloro-10-(4-ethyl-1-piperazinyl)dibenz[b,f]oxepin (maleate), M.P. 186° to 188°C (decomp.); 10[4-(2-hydroxyethyl)-1-piperazinyl)dibenz[b,f]oxepin (maleate), M.P. 167° to 168°C; 7-trifluoromethyl-10-(4-methyl-1-piperazinyl)-dibenz[b,f]oxepin(maleate), M.P. 233° to 234°C (decomp.); 8-chloro-10-[4-(1-methyl-2-hydroxyethyl)-1-piperazinyl]-1-dibenzo[b,f]-thiepin, M.P. 164° to 165.5°C; ethyl 4-(8-methoxydibenzo[b,f]thiepin-10-yl)-1-piperazineacetate (maleate), M.P. 169°C (decomp.); ethyl 4-(8-methoxydibenzo[b,f]thiepin-10-yl)-1-piperazinepropionate (maleate), M.P. 159° to 159.5°C (decomp.); ethyl 4-(8-methoxydibenz[b,f]oxepin-10-yl)-1-piperazinepropionate (maleate), M.P. 170° to 171°C (decomp.); ethyl 4-(8-methoxydibenz[b,f]oxepin-10-yl)-1-piperazineacetate (maleate), M.P. 163° to 164°C; 8-methoxy-10-[4-(3-hydroxypropyl)-1-piperazinyl]dibenzo[b,f]-thiepin (maleate), M.P. 189°C (decomp.); 8-methoxy-10-[4-(3-hydroxypropyl)-1-piperazinyl]dibenz[b,f]oxepin, M.P. 153° to 155.5°C; 8-methoxy-10-[4-(2-hydroxyethyl)-1-piperazinyl]dibenzo[b,f]thiepin, M.P. 124° to 125°C; (maleate), M.P. 194.5° to 195.5° C; 8-methylthio-10-(4-methyl-1-piperazinyl)dibenzo[b,f]thiepin (maleate), M.P. 193° to 194°C (decomp.); 8-chloro-10-[4-(3-hydroxypropyl)-1-piperazinyl]dibenzo[b,f]thiepin, M.P. 131° to 136°C; (maleate), M.P. 182°C (decomp.); 10-[4-(3-hydroxypropyl)-1-piperazinyl]dibenz[b,f]oxepin (maleate), M.P. 153° to 154°C; 8-methylthio-10-[4-(2-hydroxyethyl)-1-piperazinyl]dibenz[b,f]oxepin, M.P. 96°C; 8-amino-10-[4-(2-hydroxyethyl)-1-piperazinyl]dibenz[b,f]oxepin, I.R. 3320 cm$^{-1}$ (—OH), 1600 cm$^{-1}$ (C=C), etc.

EXAMPLE 4

A. A solution of 3.0 g of 10-(1-piperazinyl)dibenzo[b,f]thiepin and 3.0 g of 1,2-epoxypropane in 30 ml of methanol was heated at reflux for 20 hours. The reaction mixture was concentrated. The residue was dissolved in ether and filtered. An ether saturated solution of maleic acid was added to the filtrate. The precipitate was collected and recrystallized from aqueous ethanol to yield 1.8 g of 10-[4-(2-hydroxypropyl)-1-piperazhyl]dibenzo[b,f]thiepin maleate. M.P. 136°C (decomp.).

B. An excess of epoxyethane, cooled to −20°C, was added to a solution of 2.0 g of 10-(1-piperazinyl)dibenzo[b,f]thiepin in 30 ml of anhydrous ethanol. The solution was stirred at room temperature for 45 hours and concentrated. The residue was chromatographed on alumina and eluted with chloroform to yield 10-[4-(2-hydroxyethyl)-1-piperazinyl]dibenzo[b,f]thiepin. Maleate, M.P. 160° to 161°C (decomp.).

C. After addition of excess of 1,2-epoxypropane to a solution of 0.2 g of 8-methoxy-10-(1-piperazhyl)dibenzo[b,f]oxepin in anhydrous ethanol, the solution was heated at reflux for 30 minutes and treated as in (B) to yield 8-methoxy-10-[4-(a-hydroxypropyl)-1-piperazinyl]dibenzo[b,f]-oxepin. M.P. 136° to 138°C.

Other compounds which can be prepared in the substantially same manner as above include: 8-chloro-10-[4-(2-hydroxyethyl)-1-piperazinyl]dibenzo[b,f]thiepin, M.P. 138° to 139°C; (maleate), M.P. 196 to 198°C (decomp.).; 8-trifluoromethyl-10-[4-(2-hydroxyethyl)-1-piperazinyl]dibenzo[b,f]thiepin; 8-dimethylsulfamoyl-10-[4-(2-hydroxyethyl)-1-piperazinyl]dibenzo[b,f]thiepin; 10-[4-(2-hydroxyethyl)-1-piperazinyl]-dibenz[b,f]oxepin (maleate), M.P. 168° to 170°C; 8-chloro-10-[4-(2-hydroxyethyl)-1-piperazinyl]-dibenz[b,f]oxepin, M.P. 117° to 119°C; (maleate), M.P. 168° to 169°C (decomp.); 8-trifluoromethyl-10-[4-(2-hydroxyethyl)-1-piperazinyl]dibenz[b,f]oxepin; 8-dimethylsulfamoyl-10-[4-(2-hydroxyethyl)-1-piperazinyl]dibenz[b,f]oxepin, M.P. 165° to 166°C; 8-nitro-10-[4-(2-hydroxyethyl)-1-piperazinyl]dibenz[b,f]oxepin (maleate), M.P. 164° to 166°C; 8-methanesulfonyl-10-[4-(2-hydroxyethyl)-1-piperazinyl]dibenz[b,f]oxepin, M.P. 116° to 118°C; 8-ethyl-10-[4-(2-hydroxyethyl)-1-piperazinyl]dibenz[b,f]oxepin (maleate), M.P. 160°C (decomp.); 8-chloro-10-[4-(2-hydroxypropyl)-1-piperazinyl]dibenz[b,f]oxepin (maleate), M.P. 178° to 179°C (decomp.); 8-ethyl-10-[4-(2-hydroxypropyl)-1-piperazinyl]dibenz[b,f]oxepin, M.P. 130° to 132°C; 8-nitro-10-[4-(2-hydroxypropyl)-1-piperazinyl]-dibenz[b,f]oxepin, M.P. 200°C (decomp.); 5-methyl-8-chloro-10-[4-(2-hydroxyethyl)-1-piperazinyl]dibenzo[a,d]cycloheptene (maleate), M.P. 209.5°C; 5-methyl-8-chloro-10-[4-(2-hydroxypropyl)-1-piperazinyl]-dibenzo[a,d]cycloheptene; 5-methyl-10-[4-(2-hydroxyethyl)-1-piperazinyl]dibenz[b,f]azepine; 5-methyl-10-[4-(2-hydroxypropyl-1-piperazinyl]dibenz[b,f]azepine; 10-[4-(3-hydroxypropyl)-1-piperazinyl]dibenzo[b,f]thiepin, M.P. 137° to 138°C; 8-methoxy-[4-(2-hydroxyethyl)-1-piperazinyl]dibenz[b,f]oxepin, M.P. 139° to 140°C; 8-chloro-10-[4-(1-methyl-2-hydroxyethyl)-1-piperazinyl]dibenz[b,f]oxepin, M.P. 164° to 165.5°C; 8-methoxy-10-[4-(2-hydroxyethyl)-1-piperazinyl]dibenzo[b,f]thiepin, M.P. 124° to 125°C; (maleate), M.P. 194.5° to 195.5°C; 8-methylthio-10-[4-(2-hydroxyethyl)-1-piperazinyl]dibenz[b,f]oxepin, M.P. 96°C; 8-amino-10-[4-(2-hydroxyethyl)-1-piperazinyl]dibenz[b,f]oxepin, I.R. 3320 cm$^{-1}$ (—OH), 1600 cm$^{-1}$ (>C=C<), etc.

EXAMPLE 5

A. A solution of 3.1 g of ethyl 4-(8-chlorodibenz[b,f]oxepin-10-yl)-1-piperazinecarboxylate in 25 ml of tetrahydrofuran was added dropwise to a suspension of 1.0 g of lithium aluminum hydride in 90 ml of tetrahydrofuran. The resulting mixture was stirred at room temperature for 60 minutes and heated at reflux for 16 hours. After addition of 2 ml of water and about 50 ml of ether, the reaction mixture was filtered. The organic layer was separated and concentrated. The residue was recrystallized from petroleum benzin to give 8-chloro-10-(4-methyl-1-piperazinyl)dibenz[b,f]oxepin, Maleate, M.P. 187°C (decomp.).

B. A solution of 0.3 g of 8-chloro-10-(4-acetyl-1-piperazinyl)dibenz[b,f]oxepin in 15 ml of tetrahydrofuran was added dropwise to a suspension of 150 mg of lithium aluminum hydride in 15 ml of tetrahydrofuran. The resulting mixture was heated while refluxing and after cooling, admixed with 3 ml of water. The precipitated inorganic substance was filtered off. The filtrate was dried and concentrated to yield 0.3 g of 8-chloro-10-(4-ethyl-1-piperazinyl)dibenz[b,f]oxepin as oil. Maleate, M.P. 186° to 188°C (decomp.).

C. An anhydrous ether solution of 0.5 g of ethyl 4-(8-chlorodibenzo[b,f]thiepin-10-yl)-1-piperazinacetate was added dropwise with stirring to an anhydrous ether solution of lithium aluminum hydride. The resulting mixture was heated for 2 hours, and water was added to decompose excess of lithium aluminum hydride. After removal of the precipitate, the filtrate was dried and concentrated. The residue was chromatographed on alumina and eluted with benzene. The eluate was concentrated and the residue was recrystallized from 99 % ethanol to yield 8-chloro-10-[4-(2-hydroxyethyl)-1-piperazinyl]dibenzo[b,f]thiepin. M.P. 138° to 139°C. Maleate, M.P. 196° to 198°C (decomp.).

Other compounds which can be prepared in the substantially same manner as above include: 8-trifluoromethyl-10-[4-(2-hydroxyethyl)-1-piperazinyl]dibenzo[b,f]thiepin; 10-[4-(2-hydroxyethyl)-1-piperazinyl]-dibenzo[b,f]thiepin (maleate), M.P. 160° to 161°C (decomp.); 10-[4-(2-hydroxypropyl)-1-piperazinyl]dibenzo[b,f]thiepin (maleate), M.P. 159° to 161°C (decomp.); 8-chloro-10-[4-(1-methyl-2-hydroxyethyl)-1-piperazinyl]-1-dibenzo[b,f]thiepin, M.P. 164° to 165.5°C; 10-[4-(3-hydroxypropyl)-1-piperazinyl]dibenzo[b,f]thiepin, M.P. 137° to 138°C; 10-[4-methyl-2-hydroxyethyl)-1-piperazinyl]dibenzo[b,f]thiepin; 8-chloro-10-[4-(2-hydroxypropyl)-1-piperazinyl]dibenzo[b,f]thiepin; 8-chloro-10-[4-(2-hydroxyethyl)-1-piperazinyl]dibenz[b,f]oxepin, M.P. 117° to 119°C; (maleate), M.P. 168° to 170°C; 8-trifluoromethyl-10-[4-(2-hydroxyethyl)-1-piperazinyl]dibenz[b,f]oxepin; 8-chloro-10 -[4-(2-hydroxypropyl)-1-piperazinyl]dibenz[b,f]oxepin, M.P. 164° to 165.5°C; 8-methoxy-10-[4-(2-hydroxypropyl)-1-piperazinyl]-dibenz[b,f]oxepin, M.P. 136° to 138°C; 8-chloro-10-[4-(2-hydroxypropyl)-1-piperazinyl]dibenz[b,f]oxepin, M.P. 172° to 175°C; (maleate), M.P. 178° to 179°C; 8-ethyl-10- [4-(2-hydroxypropyl)-1-piperazinyl]dibenz[b,f]oxepin, M.P. 130° to 132°C; 8-chloro-10-(3-hydroxypropyl-1-piperazinyl)-dibenz[b,f]oxepin, M.P. 149° to 150.5°C; 8-trifluoromethyl-10-(3-hydroxypropyl-1-piperazinyl)-dibenz[b,f]oxepin; 10-[4-(2-hydroxyethyl)-1-diazepinyl]dibenz[b,f]oxepin (maleate), M.P. 167° to 168°C; 5-methyl-8-chloro-10-[4-(2-hydroxyethyl)-1-piperazinyl]dibenzo[a,d]cycloheptene (maleate), M.P. 209.5°C (decomp.); 10-(4-methyl-1-piperazinyl)-dibenz[b,f]oxepin (maleate), M.P. 201° to 202°C; 8-trifluoromethyl-10-(4-methyl-1-piperazinyl)dibenz[b,f]oxepin; 7-trifluoromethyl-10-(4-methyl-1-piperazinyl)dibenz[b,f]oxepin (maleate), M.P. 233° to 234°C (decomp.); 8-ethyl-1-10-(4-methyl-1-piperazinyl)dibenz[b,f]oxepin; 10-(4-methyl-1-piperazinyl)dibenzo[b,f]thiepin(oxalate), M.P. 233°C(decomp.); (maleate), M.P. 221°C; 8-methyl-10-(4-methyl-1-piperazinyl)dibenzo[b,f]thiepin (maleate), M.P. 227°C; 8-trifluoromethyl-10-(4-methyl-1-piperazinyl)dibenzo[b,f]thiepin; 8-chloro-10-(4-ethyl-1-piperazinyl)dibenzo[b,f]thiepin, M.P. 232°C (decomp.); 8-chloro-10-(4-methyl-1-piperazinyl)dibenzo[b,f]thiepin (maleate), M.P. 234°C (decomp.); 2-chloro-10-(4-methyl-1-piperazinyl)dibenzo[b,f]thiepin (maleate), M.P. 239°C (decomp.); 8-ethyl-10-[4-(2-hydroxyethyl)piperazinyl]dibenzo[b,f]oxepin (maleate), M.P. 160°C (decomp.); 8-methoxy-10-[4-(3-hydroxypropyl)-1-piperazinyl]dibenzo[b,f]thiepin (maleate), M.P. 189°C (decomp.); 8-methoxy-10-[4-(3-hydroxypropyl)-1-piperazinyl]dibenzo[b,f]thiepin, M.P. 153° to 155.5°C; 8-methoxy-10-[4-(2-hydroxyethyl)-1-piperazinyl]dibenzo[b,f]thiepin, M.P. 124° to 125°C; (maleate), M.P. 194.5° to 195.5°C; 8-methoxy-10-[4-(2-hydroxyethyl)-1-piperazinyl]-dibenz[b,f]oxepin, M.P. 139° to 140°C; 8-methylthio-10-(4-methyl-1-piperazinyl)dibenz[b,f]thiepin (maleate), M.P. 193° to 194°C (decomp.); 8-chloro-10-[4-(3-hydroxypropyl)-1-piperazinyl]dibenzo[b,f]thiepin, M.P. 131° to 136°C; (maleate), M.P. 182°C (decomp.); 10-[4-(3-hydroxypropyl)-1-piperazinyl]dibenz[b,f]oxepin (maleate), M.P. 153° to 154°C; 8-methanesulfonyl-[4-(2-hydroxyethyl)-1-piperazinyl]dibenz[b,f]oxepin, M.P. 116° to 118°C; 8-methylthio-10-[4-(2-hydroxyethyl)-1-piperazinyl]dibenz[b,f]oxepin, M.P. 96°C; 8-amino-10-[4-(2-hydroxyethyl)-1-piperazinyl]-dibenz[b,f]oxepin, I.R. 3320 cm$^{-1}$(—OH), 1600 cm$^{-1}$ (>C=C<), 8-dimethylsulfamoyl-10 -[4-(2-hydroxyethyl)-1-piperazinyl]dibenz[b,f]oxepin, M.P. 165° to 166°C, etc.

EXAMPLE 6

A. To 0.8 g of 8-chloro-10-[4-(2-hydroxyethyl)-1-piperazinyl]dibenzo[b,f]thiepin and 0.5 g of powdered potassium carbonate in 30 ml of anhydrous ether was added dropwise 0.27 g of acetyl chloride under cooling with ice-water. The resulting mixture was allowed to react for 2 hours under cooling and further at room temperature for 1 hour. The precipitated inorganic substance was filtered off. The ether layer was admixed with triethylamine, washed with water several times, dried and concentrated to yield 8-chloro-10-[4-(2-acetoxyethyl)-1-piperazinyl]dibenz [b,f]thiepin as oil. I.R. 1735 cm$^{-1}$ (—OCOCH$_3$). Maleate, M.P. 199° to 199.5° (decomp.).

Other compounds which can be prepared in the substantially same manner as above include: 10-[4-(2-acetoxyethyl)-1-piperazinyl]dibenzo[b,f]thiepin (maleate), M.P. 196°C; 8-trifluoromethyl-10-[4-(2-acetoxyethyl)-1-piperazinyl]dibenzo[b,f]thiepin; 10-[4-(3-acetoxypropyl)-1-piperazinyl]dibenzo[b,f]thiepin; 8-trifluoromethyl-10-[4-(3-acetoxypropyl)-1-piperazinyl]dibenzo[b,f]thiepin; 8-trifluoromethyl-10-[4-(2-hydroxypropyl)-1-piperazinyl]dibenzo[b,f]thiepin; 8-chloro-10-[4-(2-acetoxyethyl)-1-diazepinyl]dibenzo[b,f]thiepin; 10-[4-(3,4,5-trimethoxybenzoyloxyethyl)-1-piperazinyl]dibenzo[b,f]thiepin; 8-chloro-10-[4-(3,4,5-trimethoxybenzoyloxyethyl)-1-piperazinyl]dibenzo[b,f]thiepin; 10-[4-(2-acetoxyethyl)-1-piperazinyl]dibenz[b,f]oxepin, M.P. 125°C; 8-chloro-10-[4-(2-acetoxyethyl)-1-piperazinyl[-dibenz[b,f]oxepin (maleate), M.P. 162° to 163°C; 8-ethyl-10-[4-(2-acetoxyethyl)-1-piperazinyl]dibenz[b,f]oxepin; 8-trifluoromethyl-[4-( 2-acetoxyethyl)-1-piperazinyl]dibenz[b,f]oxepin; 8-dimethylsulfamoyl-10-[4-(2-acetoxyethyl)-1-piperazinyl]dibenz[b,f]oxepin; 8-methanesulfonyl-10-[4-(2-acetoxyethyl)-1-piperazinyl]dibenz[b,f]oxepin; 8-nitro-10-[4-(2-acetoxyethyl)-1-piperazinyl]dibenz[b,f]oxepin (maleate), M.P. 192°C (decomp.); 8-chloro-10-[4-(3-acetoxypropyl)-1-piperazinyl]dibenz[b,f]oxepin (maleate), M.P. 194°C (decomp.); 8-dimethylsulfamoyl-10-[4-(3-acetoxypropyl)-1-piperazinyl]dibenz[b,f]oxepin; 8-trifluoromethyl-10-[4-(3-acetoxypropyl)-1-piperazinyl]dibenz[b,f]oxepin; 8-methanesulfonyl-10-[4-(3-acetoxypropyl)-1-piperazinyl]dibenz[b,f]oxepin; 8-chloro-10-[4-(2-acetoxypropyl)-1-piperazinyl]dibenz[b,f]oxepin (maleate); 8-methoxy-10-[4-(2-acetoxypropyl)-1-piperazinyl]dibenz[b,- f]oxepin; 8-ethyl-10-[4-(2-acetoxypropyl)-1-piperazinyl]dibenz[b,f]oxepin, M.P. 165° to 167°C; 8-nitro-10-[4-(2-acetoxypropyl)-1-piperazinyl]-dibenz[b,f]oxepin; 8-chloro-10-[4-(1-methyl-2-acetoxyethyl)-1-piperazinyl]dibenz[b,f]oxepin; 8-chloro-10[4-(2-acetoxyethyl)-1-diazepinyl]dibenz[b,f]oxepin; 10-[4-(3,4,5-trimethoxybenzoyloxyethyl)-1-piperazinyl]dibenz[b,f]oxepin; 8-chloro-10-[4-(3,4,5-trimethoxybenzoyloxyethyl)-1-piperazinyl]dibenz[b,f]oxepin; 8-trifluoromethyl-10-[4-(3,4,5-trimethoxybenzoyloxyethyl)-1-piperazinyl]dibenz[b,f]oxepin; 5-methyl-10-[4-(2-acetoxyethyl)-1-piperazinyl]dibenzo[a,d]cycloheptene; 5-methyl-8-chloro-10-[4-(2-acetoxyethyl)-1-piperazinyl]dibenzo[a,d]cycloheptene (maleate), M.P. 197° to 197.5°C; 5-methyl-10-[4-[2-(3,4,5-trimethoxybenzoyloxy)propyl]-1-piperazinyl]dibenz[b,f]azepine; 8-methoxy-10-[4-(2-acetoxyethyl)-1-piperazinyl]dibenz[b,f]oxepin (maleate), M.P. 179° to 180°C; 8-methoxy-10-[4-(2-isobutyryloxyethyl)-1-piperazinyl]dibenz [b,f]oxepin (maleate), M.P. 175° to 177°C; 8-methoxy-10-[4-(2-acetoxyethyl)-1-piperazinyl]dibenz[b,f]oxepin (maleate), M.P. 199° to 200°C; 8-methylthio-10-[4-(2-acetoxyethyl)-1-piperazinyl]dibenz[b,f]oxepin, M.P. 179° to 180°C; 10-[4-(3-acetoxypropyl)-1-piperazinyl]dibenz[b,f]oxepin (maleate), M.P. 193°C, etc.

EXAMPLE 7

A. To a solution of 10-(4-methyl-1-piperazinyl)dibenzo[b,f]thiepin (0.5g) in nitromethane (30 ml), there is added excess of methyl iodide, and the resultant mixture is stirred at room temperature for 6 hours. After the reaction is completed, the nitromethane is distilled off from the reaction mixture. The residue is crystallized from ether and recrystallized from aqueous ethanol to give 10-(4-methyl-1-piperazinyl)dibenzo[b,f]-thiepin methiodide (0.2 g) as colorless needles. M.P. 275° to 276°C (decomp.).

EXAMPLE 8

A. To a solution of 8-nitro-10-(4-methyl-1-piperazinyl)dibenz[b,f]oxepin (11.2 g) in 99% ethanol (500 ml), there is added platinum oxide, and the resulting mixture is subjected to catalytic reduction under atmospheric pressure. When a theoretical amount of hydrogen gas is absorbed, the reaction is interrupted. The catalyst is separated by filtration. The filtrate is concentrated. The residue is crystallized from ethanol to give 8-amino-10-(4-methyl-1-piperazinyl)dibenz[b,f]oxepin (10.3 g). M.P. 200.5° to 202°C.

Other compounds which can be prepared in the substantially same manner as above include: 8-amino-10-(1-piperazinyl)dibenz[b,f]oxepin, M.P. 191° to 192°C; 8-amino-10-[4-(2-hydroxyethyl)-1-piperazinyl]-dibenz[b,f]oxepin, I.R. 3320 cm$^{-1}$ (—OH), 1600 cm$^{-1}$ (>C=C<), etc.

EXAMPLE 9

A suitable formulation of tablets consists of:

| | | Grams |
|---|---|---|
| (1) | 10-(4-Methyl-1-piperazinyl)-dibenz[b,f]oxepin | 1 |
| (2) | Lactose | 70 |
| (3) | Starch | 5 |
| (4) | Magnesium stearate | 2 |

The active ingredient, lactose and starch are thoroughly mixed and granulated. For tableting, the magnesium stearate is added, mixed with the granules, and the mixture tableted on a rotary press. Use of this procedure produces 100 tablets each containing 10 mg of the active ingredient.

EXAMPLE 10

Another suitable formulation of tablets consists of:

| | | Grams |
|---|---|---|
| (1) | 8-Chloro-10-[4-(2-hydroxyethyl)-1-piperazinyl]dibenz[b,f]oxepin | 2 |
| (2) | Mannitol | 90 |
| (3) | Starch | 6 |
| (4) | Magnesium stearate | 2 |

The active ingredient, mannitol and starch are thoroughly mixed and granulated. For tableting, the magnesium stearate is added, mixed with granules, and the mixture tableted on a rotary press. Use of this procedure produces 100 tablets each containing 20 mg of the active ingredient.

EXAMPLE 11

A suitable formulation of dragees consists of:

| | | |
|---|---|---|
| (1) | 8-Chloro-10-[4-(2-hydroxyethyl)-1-piperazinyl]dibenzo[b,f]thiepin | 12,000 grams |
| (2) | Aerosil | 4,500 grams |
| (3) | Maize starch | 4,500 grams |
| (4) | Stearic acid | 700 grams |
| (5) | Ethanol | 6.0 liters |
| (6) | Gelatin | 1,800 grams |
| (7) | Purified water | 20.0 liters |
| (8) | Talc | 600 grams |
| (9) | Magnesium stearate | 375 grams |

From the above materials, there are prepared 600,000 cores each containing 20 mg of the active ingredient in a conventional manner.

EXAMPLE 12

A suitable formulation of suppositories consists of:

| | | Grams |
|---|---|---|
| (1) | 8-Chloro-10-(4-methyl-1-piperazinyl)dibenzo[b,f]thiepin | 2,500 |
| (2) | Ethylenediaminetetraacetic acid disodium salt dihydrate | 900 |
| (3) | Witepsol H 12 | 124,100 |

From the above materials, there are prepared 100,000 suppositories each containing 25 mg of the active ingredient in a conventional manner.

What is claimed is:

1. A compound selected from the group consisting of 10-(4-(2-hydroxyethyl)-1-piperazinyl)dibenz(b,f)oxepin, 8-chloro-10-(4-(2-hydroxyethyl)-1-piperazinyl)-dibenzo(b,f)oxepin, 8-chloro-10-(4-(2-acetoxyethyl)-1-piperazinyl)-dibenz(b,f)oxepin, 8-chloro-10-(4-(3-hydroxypropyl)-1-piperazinyl)-dibenz(b,f)oxepin, 8-chloro-10-(4-(3-acetoxypropyl-1-piperazinyl)-dibenz(b,f)oxepin, 8-methoxy-10-(4-(2-hydroxyethyl)-1-piperazinyl)-dibenz(b,f)oxepin, 8-nitro-10-(4-(2-hydroxyethyl)-1-piperazinyl)-dibenz(b,f)oxepin, 8-nitro-10-(4-(2-(2-acetoxyethyl)-1-piperazinyl)-dibenz(b,f)oxepin, 10-(4-(2-hydroxyethyl)-1-piperazinyl)dibenz(b,f)thiepin and 8-chloro-10-(4-(2-hydroxyethyl)-1-piperazinyl)dibenz(b,f)thiepin.

2. The compound of claim 1 which is 10-[4-(2-hydroxyethyl)-1-piperazinyl]dibenz[b,f]oxepin.

3. The compound of claim 1 which is 8-chloro-10-[4-(2-hydroxyethyl)-1-piperazinyl]-dibenzo[b,f]oxepin.

4. The compound of claim 1 which is 8-chloro-10-[4-(2-acetoxyethyl)-1-piperazinyl]-dibenz[b,f]oxepin.

5. The compound of claim 1 which is 8-chloro-10-[4-(3-hydroxypropyl)-1-piperazinyl]-dibenz[b,f]oxepin.

6. The compound of claim 1 which is 8-chloro-10-[4-(3-acetoxypropyl)-1-piperazinyl]-dibenz[b,f]oxepin.

7. The compound of claim 1 which is 8-methoxy-10-[4-(2-hydroxyethyl)-1-piperazinyl]-dibenz[b,f]oxepin.

8. The compound of claim 1 which is 8-nitro-10-[4-(2-hydroxyethyl)-1-piperazinyl]-dibenz[b,f]oxepin.

9. The compound of claim 1 which is 8-nitro-10-[4-(2-(2acetoxyethyl)-1-piperazinyl]-dibenz[b,f]oxepin.

10. The compound of claim 1 which is 10-[4-(2-hydroxyethyl)-1-piperazinyl]dibenz[b,f]thiepin.

11. The compound of claim 1 which is 8-chloro-10-[4-(2-hydroxyethyl)-1-piperazinyl]dibenz[b,f]thiepin.

* * * * *